United States Patent
Das et al.

(10) Patent No.: US 7,509,240 B2
(45) Date of Patent: Mar. 24, 2009

(54) SOLID FREEFORM FABRICATION OF STRUCTURALLY ENGINEERED MULTIFUNCTIONAL DEVICES

(75) Inventors: Suman Das, Ann Arbor, MI (US); Scott J Hollister, Ann Arbor, MI (US); Paul H Krebsbach, Ann Arbor, MI (US); James K Santosa, Wilmington, DE (US)

(73) Assignee: The Regents of The University of Michigan, Ann Arbor, MI (US)

( * ) Notice: Subject to any disclaimer, the term of this patent is extended or adjusted under 35 U.S.C. 154(b) by 707 days.

(21) Appl. No.: 10/268,359

(22) Filed: Oct. 10, 2002

(65) Prior Publication Data

US 2003/0074096 A1  Apr. 17, 2003

Related U.S. Application Data

(60) Provisional application No. 60/329,479, filed on Oct. 15, 2001.

(51) Int. Cl.
*G06F 17/50* (2006.01)
(52) U.S. Cl. .................. 703/1; 703/5; 264/16; 264/401
(58) Field of Classification Search .................. 703/5
See application file for complete search history.

(56) References Cited

U.S. PATENT DOCUMENTS

| | | | |
|---|---|---|---|
| 5,038,014 A * | 8/1991 | Pratt et al. ............. | 219/121.64 |
| 5,402,351 A | 3/1995 | Batchelder et al. | |
| 5,490,962 A | 2/1996 | Cima et al. | |
| 5,518,680 A | 5/1996 | Cima et al. | |
| 5,555,481 A | 9/1996 | Rock et al. | |
| 5,639,402 A | 6/1997 | Barlow et al. | |
| 5,663,883 A | 9/1997 | Thomas et al. | |
| 5,837,960 A * | 11/1998 | Lewis et al. ............. | 219/121.63 |
| 6,112,109 A * | 8/2000 | D'Urso ............. | 600/407 |

(Continued)

OTHER PUBLICATIONS

Ramaswami "Process Planning for Shape Deposition Manufacturing", Jan. 1997.*

(Continued)

*Primary Examiner*—Kamini S Shah
*Assistant Examiner*—Saif A Alhija
(74) *Attorney, Agent, or Firm*—Harness, Dickey & Pierce, P.L.C.

(57) ABSTRACT

A selective laser sintering technique and system are provided for producing a heterogeneous product. The selective laser sintering technique and system is generally comprised of generating a computer model of the product and processing the model to obtain numerous cross-sectional representations of the model. The cross-sectional representations are manufactured layer by layer to create the product. Specifically, numerous different powders having a variety of properties are placed within nozzles positioned above a deposition bed using a hopper. Using the computer model as a guide, the different powders are placed at different positions on the deposition bed to form each layer of the device. The deposited powders are consolidated, micromachined, and milled using one or more lasers to create the product. Using this selective laser sintering technique a wide variety of heterogenous products may be produced, such as the following: 1) bio-implants, 2) small scale energy production, storage and conversion devices, 3) devices that exploit anomalous material behavior, and 4) nanocomposites.

46 Claims, 4 Drawing Sheets

U.S. PATENT DOCUMENTS

| | | | |
|---|---|---|---|
| 6,143,293 | A | 11/2000 | Weiss et al. |
| 6,176,874 | B1 | 1/2001 | Vacanti et al. |
| 6,183,515 | B1 | 2/2001 | Barlow et al. |
| 6,197,575 | B1 | 3/2001 | Griffith et al. |
| 6,214,279 | B1 * | 4/2001 | Yang et al. .................. 264/482 |
| 6,391,251 | B1 * | 5/2002 | Keicher et al. ................. 419/7 |
| 6,405,095 | B1 * | 6/2002 | Jang et al. ................... 700/118 |

OTHER PUBLICATIONS

Fitzgerald "A Pneumatic Conveying Powder Delivery System for Continuously Heterogeneous Material Deposition in Solid Freeform Fabrication", Jul. 1996.*

Dimov et al. "Rapid Prototyping" Sep. 6, 2001.*

Fitzgerald "A Pneumatic Conveying Powder Delivery System for Continuously Heterogeneous Material Deposition in Solid Freeform Fabrication", Jul. 1996.*

TheriForm Machine Development; Therics; http://www.therics.com/machine.html (2 pages undated).

Channel Surfing: A Profile of Electronic Multichannel Pipettors: Michael Brush; The Scientist (Aug. 31, 1998); http://www.the-scientist.com/yr1998/august/profile1_980831.html (6 pages).

International Search Report mailed Jan. 29, 2003, Int'l App. No. PCT/US02/32434.

Therics. TheriForm Machine Development, [online], [retrieved on Jan. 8, 2003]. Retrieved from the internet <URL: http://www.therics.com/machine.html> (2 pages).

Michael Brush. Channel Surfing. A profile of Electronic Multichannel Pipettors; The Scientist (Aug. 31, 1998), [online], [retrieved on Jan. 8, 2003]. Retrieved from the Interent <URL: http://www.the-scientist.com/yr1998/august/profile1_980831.html> (6 pages).

TheriForm Technology; Therics, L.L.C.; Product literature received Nov. 7, 2006.

Brush, M.; "Channel Surfing: A Profile of Electronic Multichannel Pipettors"; The Scientist 12[17]:14, Aug. 31, 1998.

* cited by examiner

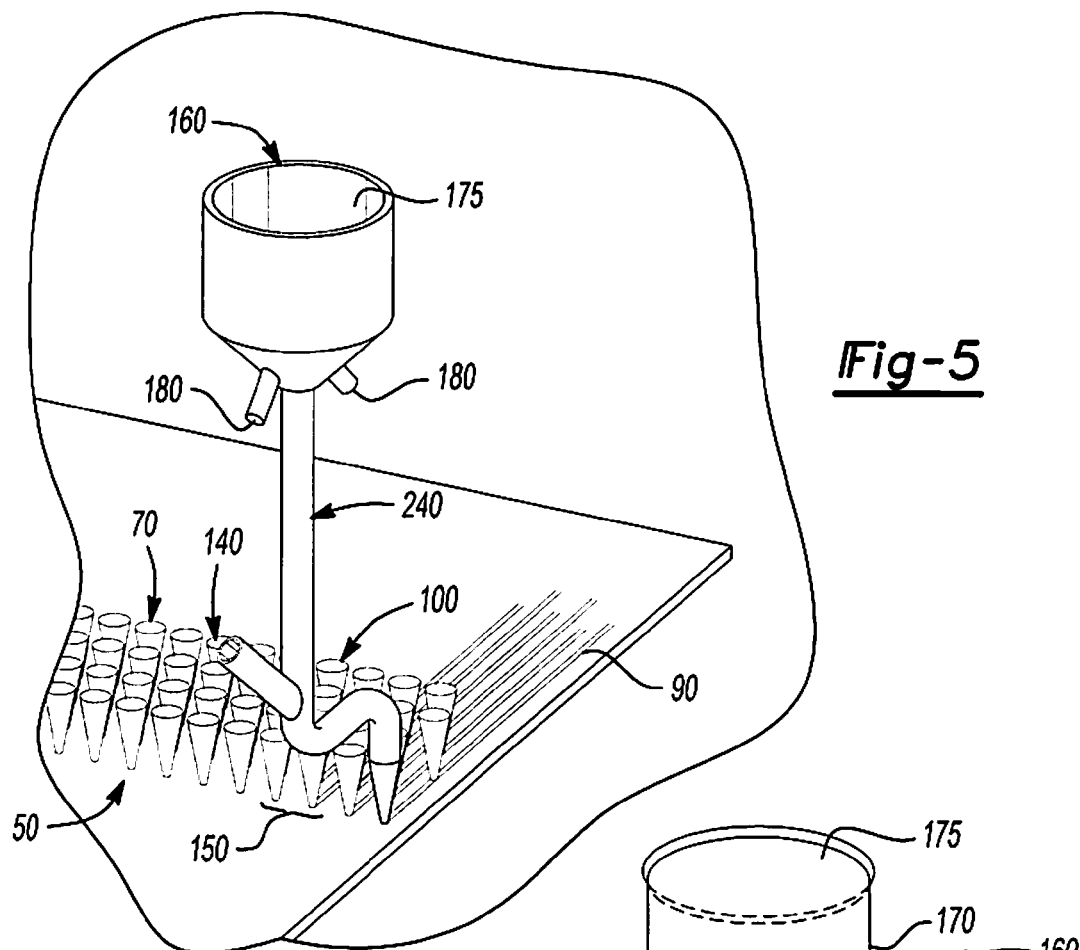
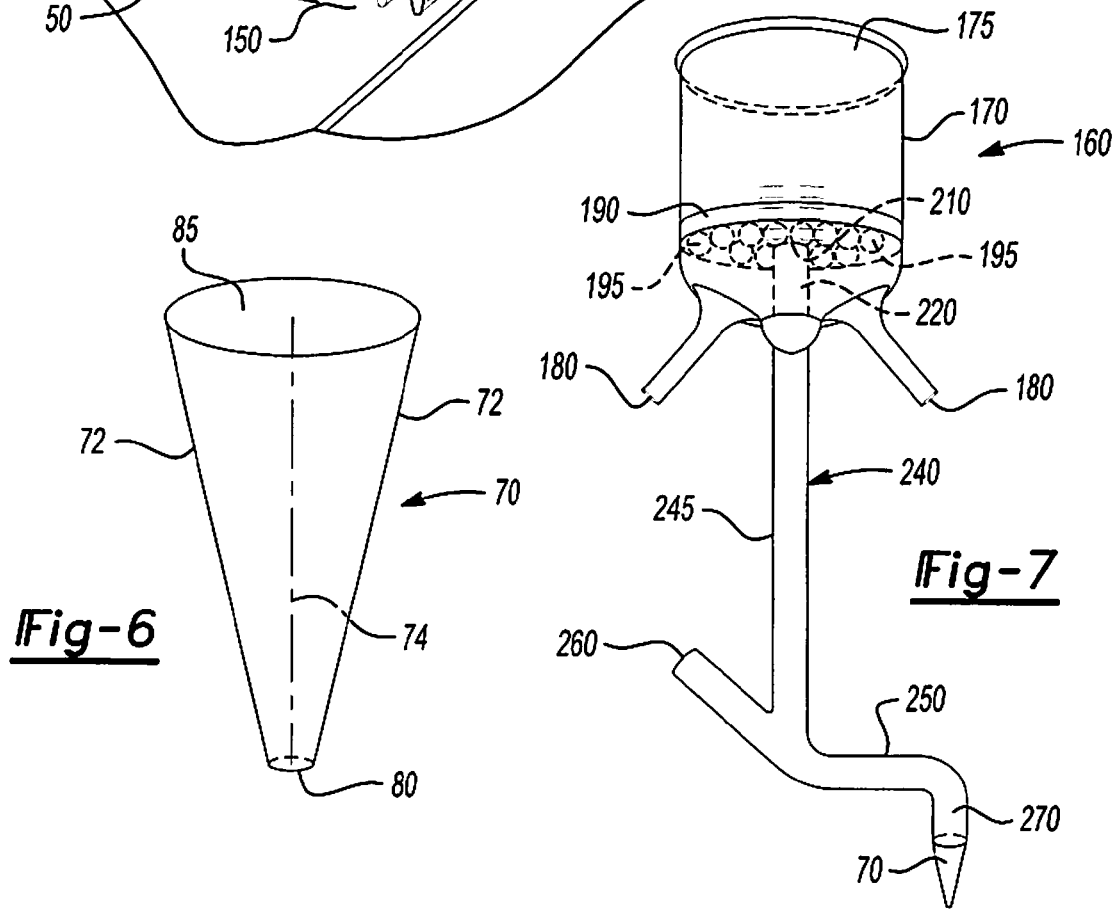

SOLID FREEFORM FABRICATION OF STRUCTURALLY ENGINEERED MULTIFUNCTIONAL DEVICES

CROSS REFERENCE TO RELATED APPLICATIONS

This application claims the benefit of U.S. Provisional Application Ser. No. 60/329,479 filed Oct. 15, 2001 entitled "Solid Freeform Fabrication of Structurally Engineered Multifunctional Devices.

FIELD OF THE INVENTION

The present invention relates to the construction of a broad variety of objects with tailored heterogeneous or varying material compositions designed with specific properties and for specific performance, such as bio-implants, using a solid freeform fabrication technique based on selective laser sintering.

BACKGROUND OF THE INVENTION

The solid freeform fabrication method known as selective laser sintering is a layered manufacturing technique that is capable of fabricating complexly shaped objects directly from computer models (CAD) using a laser to selectively fuse powder particles together. Selective laser sintering is one of several commercially available solid freeform fabrication technologies that can build objects layer by layer. However, presently there are no solid freeform fabrication technologies that can build objects with functionally tailored heterogeneous or varying material compositions.

While conventional selective laser sintering technology allows a user to create a variation in material composition along the build direction by intentionally layering powders of different compositions along the depth of an selective laser sintering powder supply bin, in order to deposit a true three-dimensional composition gradient varying in both the build direction as well as across the plane of each layer, a different type of powder deposition mechanism from that which is currently used is required. A typical solid freeform fabrication process is illustrated in FIG. 1.

Solid freeform fabrication processes rely on the concept of layer-by-layer material addition to selected regions. A computer 10 is used to generate a model 11 that serves as the basis for making a replica of a desired structure. The computer-generated model 11 is mathematically sliced into thin cross-sectional layer representations via an automatic process planner 12 to form a sliced model 13. Each slice is created in the material of choice to build a complete, three-dimensional object. To build the physical shape, the material of each layer is selectively added or deposited and fused to the previous layer in an automated fabrication machine 14.

FIG. 2 illustrates the well known solid freeform fabrication technique of selective laser sintering. In the selective laser sintering process, a layer of powdered material 16 from a powder supply bin 18 is applied to a deposition bed 20. The powder 16 is spread over the top surface of a partially manufactured growing sintered prototype 22 by a roller mechanism 24. A laser 26 is then used to selectively scan the layer of powder 16 to fuse portions of the powder 16 to form a particular cross-sectional layer of the model 13. Subsequent layers are fused together in the same manner.

The laser beam 26 is directed using computer-controlled mirrors 28 which are themselves directed by the automatic process planner 12. Any unfused material 30 remains in place as a support structure of the sintered prototype 22. After each layer of powder 16 is deposited, an elevator platform 32 lowers the growing sintered prototype 22 by the thickness of the layer deposited and the next layer of powder 16 is deposited. When the shape of the prototype 22 is completely formed, the prototype 22 is separated from the unfused material 30. The sintered prototype 22 produced using this traditional selective laser sintering technique has a homogenous composition.

In contrast to present selective laser sintering techniques, Applicants' invention uses selective laser sintering to build heterogeneous functionally tailored composite devices. In order to accomplish Applicants' goal of using selective laser sintering to build such composite devices, powders of different compositions must be deposited in prescribed patterns layer by layer as the particular device is manufactured.

SUMMARY OF THE INVENTION

In order to produce a heterogeneous product having a true three-dimensional composition gradient, the present invention provides for an selective laser sintering technique that deposits multiple materials in prescribed patterns through the use of a nozzle array. The design of this selective laser sintering deposition system is based on the fluid mechanics and control of granular matter in miniature hoppers and narrow tubes under gravity flow or gas assisted flow conditions. If the operator desires to deposit micro- to nano-scale materials with a better feature resolution than that of the nozzle array, the invention provides for the use of a micropipette deposition system. Once the desired powder or micro- to nano-scale material has been deposited, laser sintering is used to selectively consolidate the deposited materials. The laser sintering may optionally be followed by a planarization step using laser milling to obtain a consolidated layer of uniform thickness, and also optionally followed by laser micromachining to resolve fine features. This process is repeated layer by layer to complete the multifunctional device.

Devices that may be produced using the above process include, but are not limited to, the following: 1) bio-implants for tissue regeneration and drug delivery, 2) small scale energy production, storage and conversion devices such as micro-combustors, micro-reactors, and micro-fuel cells, 3) devices that exploit anomalous material behavior, for example negative Poisson's ratio or negative coefficient of thermal expansion, and 4) nanocomposites such as nanocomposite magnets, polymer nanocomposites, nonocomposite cermets and electromagnetic or acoustic bandgap devices.

With respect to bio-implants, the new solid freeform fabrication methods of this invention can be used to directly construct biomedical implants with functionally tailored geometry, composition, and porosity. Sources of digital data for constructing such devices include, but are not limited to, three-dimensional computer-aided design (CAD) models as well as bio-imaging digital data from techniques such as computed tomography (CT), magnetic resonance imaging (MRI) or confocal laser scanning microscopy. Using these methods, for example, a whole joint tissue engineering scaffold structure including a bone scaffold (made from ceramic or ceramic-polymer composite), combined with a cartilage scaffold (made with polyglycolic acid) and a ligament scaffold (made with co-polymers of polyactic acid and polyglycolic acid) with different functional architectures can be built in a single assemblage. During construction, each layer of the scaffold structure can be volumetrically seeded with precise dosages of drugs, proteins, genes or cells in prescribed patterns so as to induce the local growth of specific types of tissues or blood vessels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a schematic representation of a nozzle array powder deposition system having a bed length array.

FIG. 6 a schematic representation of a single nozzle of a nozzle array powder deposition system.

FIG. 7 is a schematic representation of a micro-hopper used to deliver powder to a nozzle of a nozzle array powder deposition system.

DETAILED DESCRIPTION OF THE PREFERRED EMBODIMENTS

The following description of the preferred embodiments is merely exemplary in nature and is in no way intended to limit the invention, its application, or uses.

The present invention is directed towards a next-generation solid freeform fabrication technique based on selective laser sintering that enables the construction of a broad variety of structurally engineered multifunctional devices. The present invention modifies the traditional selective laser sintering technique described above to produce, in addition to the traditional homogeneous products, heterogeneous, functionally tailored, composite devices. Such devices a) incorporate multiple material compositions with discrete and/or functionally graded interfaces within their volume, b) have a topological structure that is digitally engineered to science-based design principles, and c) provide multi-functional devices, i.e. devices that are engineered so that the spatial arrangement of their material composition provides at least one additional function (e.g. sensing or actuation) in addition to structural integrity. Examples of such functionally tailored devices include: 1) bio-implants for tissue regeneration and drug delivery 2) small-scale energy production, storage and conversion devices such as micro-combustors, micro-reactors, and micro-fuel cells 3) devices that exploit anomalous material behavior, for example negative Poisson's ratio or negative coefficient of thermal expansion, and 4) nanocomposites, for example, nanocomposite magnets, polymer nanocomposites, nanocomposite cermets and electromagnetic or acoustic bandgap devices.

Figure 3:
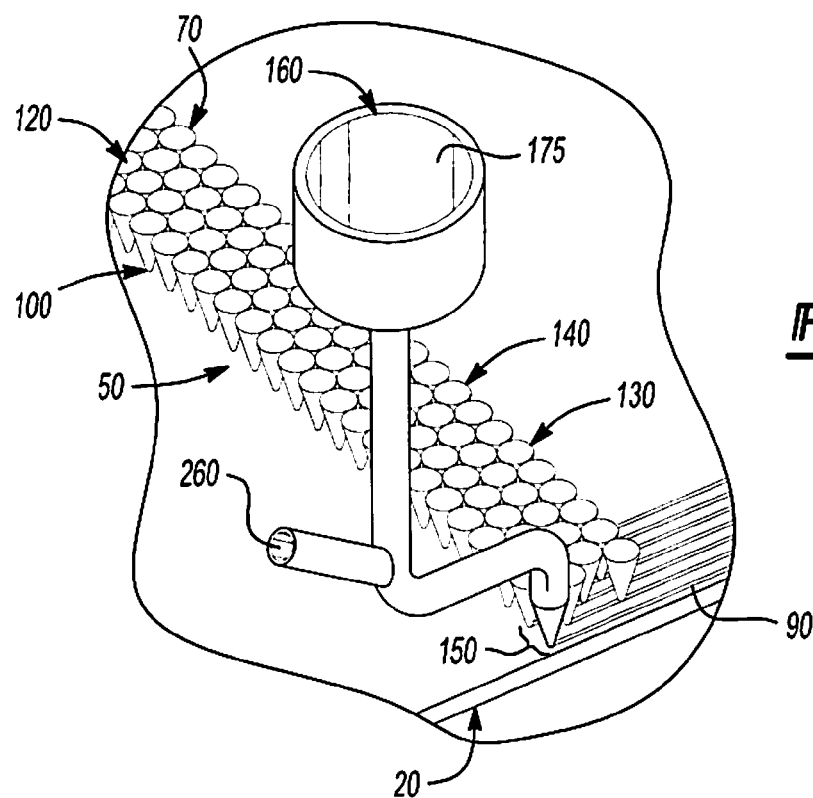
FIG. 3 is schematic representation of a nozzle array powder deposition system with a powder supply hopper shown for one nozzle.
Figure 4:
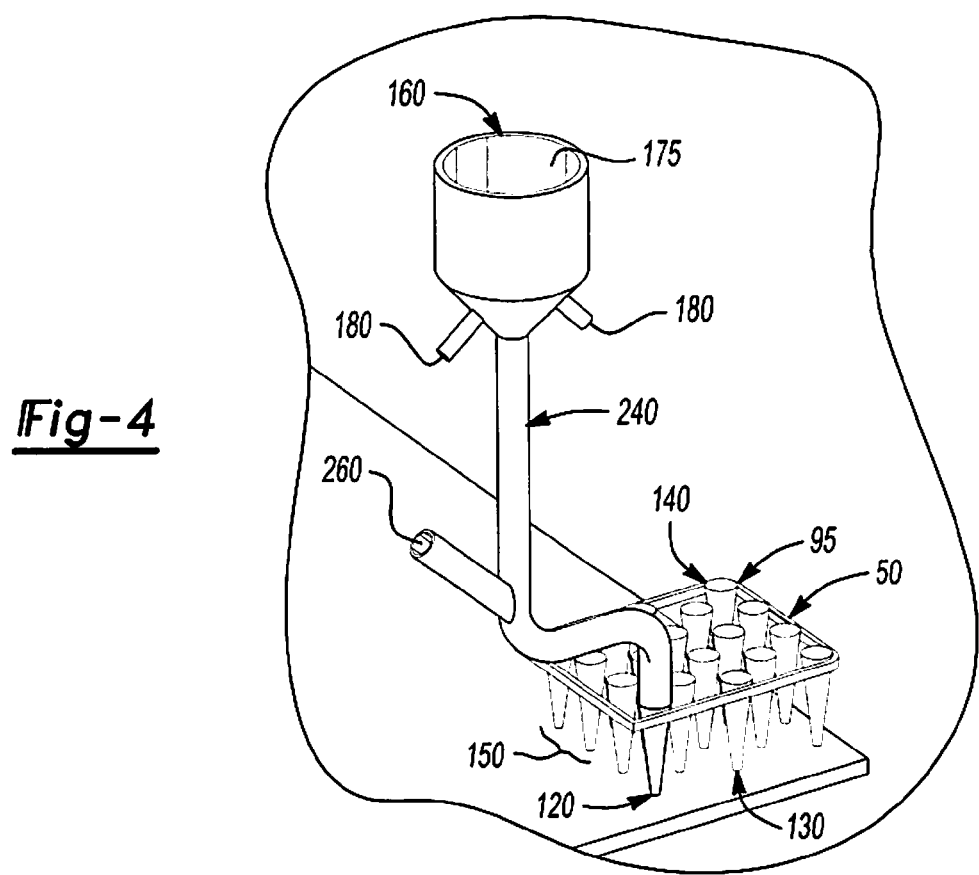
FIG. 4 is a schematic representation of a nozzle array powder deposition system having a sectional array.

In order to produce the heterogeneous multifunctional devices described above, the present invention uses a modified solid freeform fabrication technique. As seen in FIGS. 3, 4, and 5, the invention uses an array 50 to deposit the desired composition of powder 16, illustrated in the form of a powder line 90, upon a deposition bed 20. The array 50 is comprised of a multitude of nozzles 70, illustrated in detail in FIG. 6. Each nozzle 70 contains a nozzle opening 80 through which the powder 16 is released and a filling point 85 where the powder 16 to be deposited is loaded. The nozzles 70 may be of various tapered shapes, such as conical. The nozzle opening 80 may also be of various sizes but is preferably sized between 0.1 mm and 5 mm. The nozzle deposition opening 80 may also be of various shapes depending on the type of powder line 90 which is desired to be deposited. For example, if a square opening is used the powder line 90 exhibits straight edges while a circular opening deposits lines 90 with rounded edges. Regardless of the shape chosen, the half-angle of the nozzle 70, or the angle between the perimeter 72 and the center axis 74, should be preferably less than approximately 10.2 degrees.

The array 50 may exist in at least two configurations, including a sectional array 95 and a bed length array 100. The sectional array 95 consists of a number of nozzles 70 sufficient to cover only one particular portion of deposition bed 20. The bed length array 100 consists of a number of nozzles 70 sufficient to cover the entire length of the deposition bed 20. Regardless of the array configuration, the array 50 may be either stationary or movable. A movable array 50 is computer controlled and positioned using the sliced CAD model 13 so that different nozzles 70 with different compositions of powder 16 can deposit material in the correct positions on the deposition bed 20 to form the desired product features. Powder 16 may also be deposited to form the desired product features through the use of a stationary array 50. In contrast to the movable array 50, the stationary array 50 remains stationary while the entire deposition bed 20 is moved in response to directions provided by the sliced CAD model 13. In this manner, the deposition bed 20 is positioned so that the nozzle or nozzles 70 with the preferred powder 16 are properly positioned to create the desired heterogeneous composition.

Each array 50 contains numerous rows 120 and columns 130 of nozzles 70. The orientation and number of rows 120 and columns 130 depends on the desired resolution of the deposited feature, the area to be deposited, and the number of differing materials which are desired to be deposited. If it is desired that a large area of the deposition bed 20 be deposited quickly, a larger number of nozzles 70 will allow for several powder lines 90 to be deposited at the same time. Also, if powder lines 90 of numerous compositions are desired, several nozzles 70 will be needed to carry the different powders 16.

To obtain features of particularly high resolution, the array 50 is preferably a staggered array 140. In staggered array 140, the nozzles 70 are positioned so that nozzles 70 in successive rows 120 deposit material in the gap area 150 between the nozzles 70 of the preceding and/or succeeding row 120. As a result of this staggered configuration, the powder 16 is deposited with greater resolution producing an object with more exactly defined features. The more rows 120 of nozzles 70 which are placed in such a staggered configuration, the greater the achieved feature resolution.

To load each nozzle 70 with powder 16, a micro-hopper 160 is used. Each nozzle 70 may have its own micro-hopper 160 or each array 50 may have one or a series of micro-hoppers 160 that are moved to each nozzle 70 using a suitable device. The micro-hopper 160 contains a glass funnel that is preferably in the form of a Buchner funnel 170 (FIG. 7). The funnel 170 has an upper orifice 175. The funnel 170 further has two aeration points 180 that extend from the funnel 170 at a point below the position of a fritted glass disk 190 that is bonded to the funnel 170. The fritted glass disk 190 contains numerous pores 195 that are sized to permit the passage of air or gas while restricting the downward passage of powder 16. The disk 190 also contains a hole 210 from which extends a glass tube 220. The glass tube 220 extends through the bottom of the funnel 170 to a standpipe 240.

The standpipe 240 contains an elongated portion 245 that transitions to an elbow portion 250. Preferably, an elbow aeration point 260 is positioned along standpipe 240 in close proximity to elbow portion 250. While elbow portion 250 is illustrated in FIG. 7 as being positioned between standpipe 240 and elbow 250, it should be appreciated that elbow aeration point 260 may be positioned at any point along standpipe 240 and at any angle to the standpipe 240. The transition of elongated portion 245 to elbow portion 250 is shown to occur in FIGS. 3, 4, 5, and 7 at a 90 degree angle but angles of less than 90 degrees may be used and the elbow portion 250 may also be offset from the standpipe 240.

At the end of the elbow portion 250, the standpipe 240 again transitions approximately 90 degrees and terminates at deposition point 270 where the material to be deposited is emptied into the nozzle 70. While FIGS. 3, 4, 5, and 7, depict the transition to the deposition point 270 as a 90 degree angle, angles of less then 90 degrees may also be used and the standpipe 240 may be offset at this point. Further, it should be noted that while FIGS. 3, 4, 5, and 7 illustrate the elbow 250 to be of a length that is much shorter than the elongated portion 245, such a relation is not necessary and the lengths of both the standpipe 240 and the elbow 250 are variable.

During the deposition process, powder 16 is inserted into the top of the funnel 170. The powder 16 may be deposited by hand or using any suitable machine controlled filling process. Upon filling the funnel with powder 16, a portion of the powder 16 falls, as the result of gravity, through the hole 210 in the fritted glass disk 190. The powder 16 then proceeds through the elongated portion 245 and stops at a point along the elbow 250. The point at which the powder 16 stops depends upon the internal friction angle of the particular powder 16.

Depending upon the angle of internal friction of the particular powder 16 used, friction may cause the powder 16 to stop flowing down the standpipe and become clogged above the glass disk 190. In order to prevent the powder 16 from clogging above the glass disk 190, compressed air or gas under pressure may be introduced through the funnel 170 at orifice 175 and/or aeration points 180. The air or gas inserted through the aeration points 180 travels through the pores 195 of the glass disk 190. The air or gas reduces the internal friction between particles and allows them to flow freely about the funnel 170 and down the standpipe 240. Further, vibrational forces may be applied to the standpipe 240 or the nozzle 70 to fluidize the powder 16. Regardless of the amount of air, gas, or vibrational forces used to fluidize the powder 16, the powder 16 will eventually come to rest at a point in the elbow 250 due to friction and gravity.

In order to control the flow of powder 16 through the elbow 250, compressed air or gas is introduced at the elbow aeration point 260. Air or gas introduced at the elbow aeration point 260 causes the powders 16 to overcome their coefficient of friction and flow freely through the elbow 250 to the deposition point 270. The air or gas introduced at the elbow aeration point 260 may further assist in the fluidization of the powder 16 if it is introduced at a pressure different than that of the gas or air introduced at aeration points 220. If gas or air is not added at the elbow aeration point 260, the powder 16 will generally not flow to the nozzle 70. In this manner, the elbow aeration point 260 acts as a stop/start valve which provides the operator with control over the flow and deposition of powder 16 on the deposition bed 20.

The fluidization of powders with air as described above requires knowledge of the minimum fluidization velocity of the particular powder 16 used. The minimum fluidization velocity is the velocity which the introduced air or gas must obtain in order for fluidization to occur. The minimum fluidization velocity of powders which fall under the Geldart A classification may be calculated using the following equation:

$$U_{mf} \approx 420 \rho_p d_v^2$$

where Umf=minimum fluidization velocity (m/s);
$\rho_p$=bulk density of the powder (g/m$^3$);
$d_v$=mean particle diameter based on volume (m); and
420=an empirical value for particles in air (m$^2$/g-s).

Typical Geldart A powders have a fine powder particle diameter between 0.1 μm and 100 μm and bulk material that is considered largely non-cohesive or fair to free flowing in nature. Such properties are desired for selective laser sintering applications and thus the above equation may be used to determine the velocity of air or gas required to fluidize powders used in the invention. While the above equation is presently preferred, it is contemplated that further study will reveal a more optimized equation to more accurately define the fluidization velocity of select powders.

Using the micro-hopper 160, trial runs were conducted using gravity flow and air assisted flow for a hopper with an orifice diameter of 0.5, 0.75, and 1 mm. The trials indicate that a standpipe with an elbow aeration point 260 is capable of stopping the flow of powders and that when the elbow 250 remains horizontal, the powder particles 16 come to rest above the nozzle 70 at the angle of repose, which is approximately 23 degrees. The trials also show that when air is introduced at the aeration point 180, the powder 16 in the standpipe 240 and the powder 16 above the fritted glass disk 190 is fluidized while the powder 16 in the elbow portion 250 is not fluidized.

The following table illustrates how varying nozzle diameters coupled with either gravity or air assisted flow affect the average mass flow rate, volume delivered per second, and the time required to draw a 250 μm high, 6 inch (0.1524) powder line for the micro-hopper of the invention.

TABLE 1

Results from prototype hopper tests for 100 μm glass beads (bulk density 2480 kg/m$^3$).

| Nozzle diameter (mm) | Gravity flow or Air assisted | Average mass flow rate (g/s) | Volume delivered per second (m$^3$/s) | Time to draw a 250 um high, 6 in. (.1524 m) line |
|---|---|---|---|---|
| 0.5 | G | 0.0283 | 1.9 × 10$^{-8}$ | 0.79 seconds |
| 0.5 | A | 0.045 | 3.0 × 10$^{-8}$ | 0.50 seconds |
| 0.75 | G | 0.0316 | 2.1 × 10$^{-8}$ | 0.71 seconds |
| 0.75 | A | 0.0616 | 4.1 × 10$^{-8}$ | 0.37 seconds |
| 1.0 | G | 0.0717 | 4.81 × 10$^{-8}$ | 0.32 seconds |
| 1.0 | A | 0.1 | 6.7 × 10$^{-8}$ | 0.22 seconds |

The results indicate that as the orifice diameters of nozzle 70 increase, the flow rates for a single powder increase, the volume of powder delivered per second increases, and the time required to draw a 250 µm high, 6 inch powder line decreases. Further, the results show that the flow rate for all diameters was improved by approximately 0.025 g/sec when assisted with air.

Figure 8:
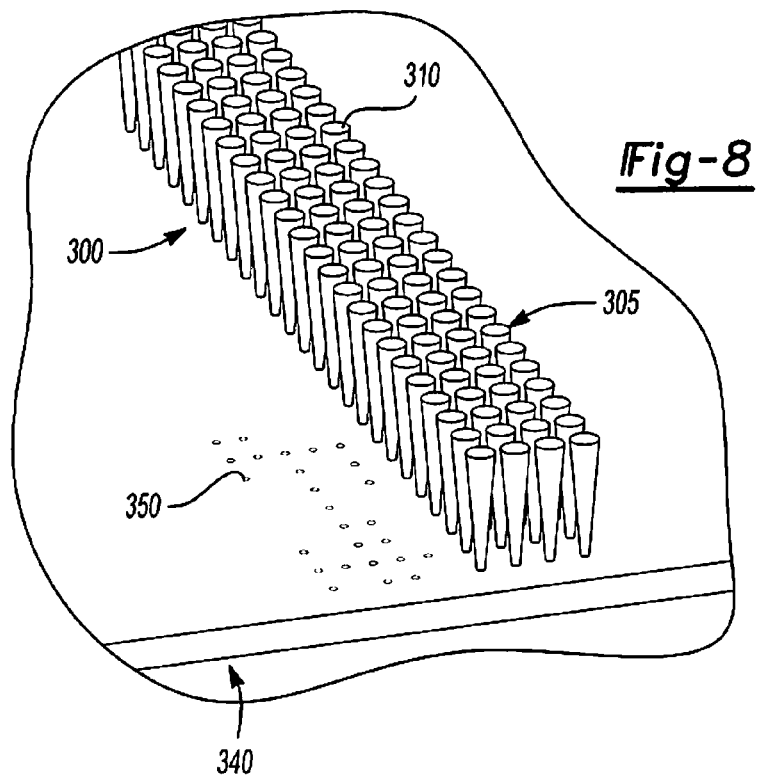
FIG. 8 is a schematic representation of a micropipette array used in selective laser sintering for the deposition of liquid suspensions upon a deposition bed.
Figure 9:
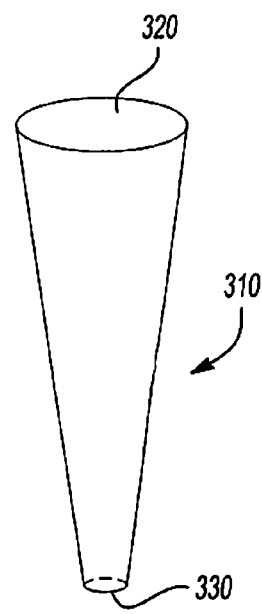
FIG. 9 is a schematic representation of a micropipette used in selective laser sintering for the deposition of liquid suspensions upon a deposition bed.

When the desired feature to be deposited is less then 100 µm, and/or a liquid, paste, or particulate suspension, a specialized material deposition system comprised of a micropipette array 300, as seen in FIGS. 8 and 9, is used. The micropipette array 300 consists of numerous micropipettes 310 arranged in rows and columns. The micropipettes 310 range in length from 1 inch to 3 inches. The micropipettes 310 contain an upper opening filling point 320 in which the material to be deposited is added to the micropipette 310 and a lower opening 330 from which the material is deposited upon a deposition bed 340. The lower opening 330 has a diameter ranging from 100 microns to less than 100 nanometers. When the desired material to be deposited is in the form of a liquid, the micropipette 310 is able to release 0.2 microliters to 2,000 microliters in volume increments as low as 0.01 microliters of liquid. The micropipette array 300 may be in the form of a staggered array such that the lower openings 330 of the micropipettes of a particular row are between the lower openings 330 of the micropipettes of the preceding or succeeding row. Such an arrangement provides for feature resolution in the manufactured item which is at least 10 µm and is an order of magnitude finer than that of nozzle array 50.

The array 300 of micropipettes 310 may either be in the form of a bed length array, 305 or a sectional array (not shown). The bed length array 305 consists of a sufficient number of micropipettes 310 to completely span the length of the deposition bed 340. Alternatively, a sectional array consists of a number of micropipettes 310 sufficient to cover only one particular portion of the deposition bed 340. The micropipettes 310 are able to deposit precise sub-microliter quantities of liquid solutions or particulate suspensions 350. The particular material to be deposited is inserted within each micropipette 310 using a suitable device, such as a syringe. The syringe may be controlled either manually or through the use of a computer controlled device.

The micropipette array 300 may be mounted in an XYZ computer controlled motion control platform that can actuate the array across the entire deposition bed 340 so that the liquid materials are deposited in the proper formation and location to build the product according to the sliced CAD model 13. Alternatively, the micropipette array 300 may be mounted in a stationary position while the entire deposition bed 340 is moved in response to directions provided by the sliced CAD model 13. In this manner, the deposition bed 340 is positioned so that the micropipettes 310 with the preferred solutions or suspensions are placed over the preferred deposit area of the deposition bed 340 to form the desired product.

The micropipette array 300 of the invention may be used in many applications including, but not limited to, the following. First, the array 300 may be used in the deposition of precise dosages of drugs or bioactive factors (that may or may not be micro-encapsulated in a secondary material), such as proteins, genes, and viruses, for controlled release in functionally tailored biomedical implants. Second, array 300 may be used in the deposition of nanocomposite precursor materials including nano-powders, nano-flakes and nano-tubes in the forms of dots, lines, and other fine patterns across a planar layer. Third, the array 300 may be used in the deposition of micro- to nano-particles in previously laser-etched channels for embedding a network of conductors, optical transmitters, micro-heaters, RF antennas, or transducers. Fourth, the array 300 may be used to deposit layers of solutions which crystallize upon drying. After product fabrication, the dry crystals may then be leached or dissolved out to create an empty void resulting in a product, such as a bio-implant, with an interconnected network of porosity. Fifth, the array 300 may be used to deposit polymers capable of passing electric current. Such polymers can be used in bio-implants for electromagnetically assisted healing. Sixth, and finally, the array 300 may be used in the precise deposition of organic, organometallic or inorganic compounds that can act as local sintering aids, local alloying agents, local compound forming agents or local surfactants.

After the desired material is deposited using either the nozzle array 50 or the micropipette array 300, the deposited liquid or powder patterns are then consolidated to the desired density by laser processing. To accurately fabricate an object using solid freeform fabrication, control must be exerted not only over feature definition within each layer but also over layer thickness. In conventional selective laser sintering, unevenness of consolidated surfaces and thermal growth beyond desired boundaries contributes to poor feature definition and non-uniform layer thickness on the order of at least powder particle size.

The present selective laser sintering technique overcomes the laser processing control problems of traditional selective laser sintering techniques through the consolidation of powders and deposited liquid material using laser sintering, followed by laser micromachining for fine feature definition or patterned microporosity creation, and laser milling for layer planarization. Laser micromachining may be used for the creation of features as small as 10 µm. Scanning laser milling using a Q-switched laser with 40-100 µm focal spot size can be used for precise material removal by ablation resulting in a final Root Mean Square (RMS) surface roughness of less than 1 µm.

Figure 1:
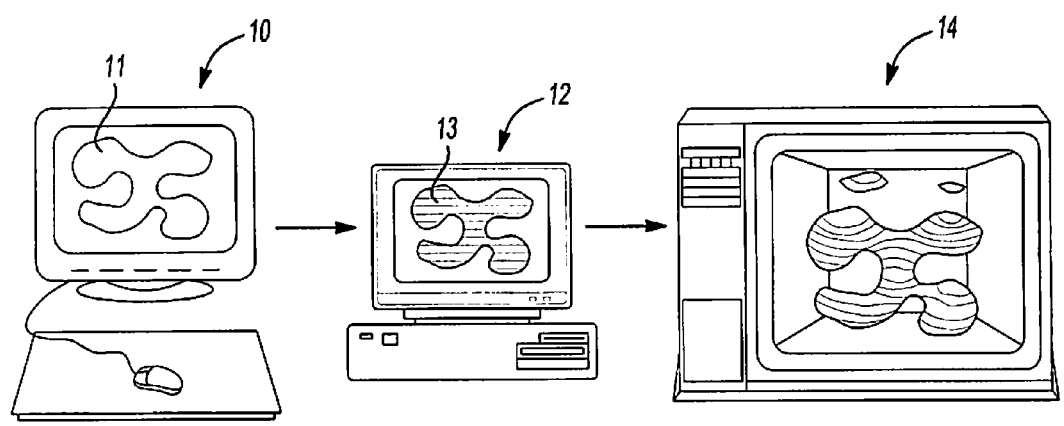
FIG. 1 is a schematic representation of a conventional solid freeform fabrication technique.
Figure 2:
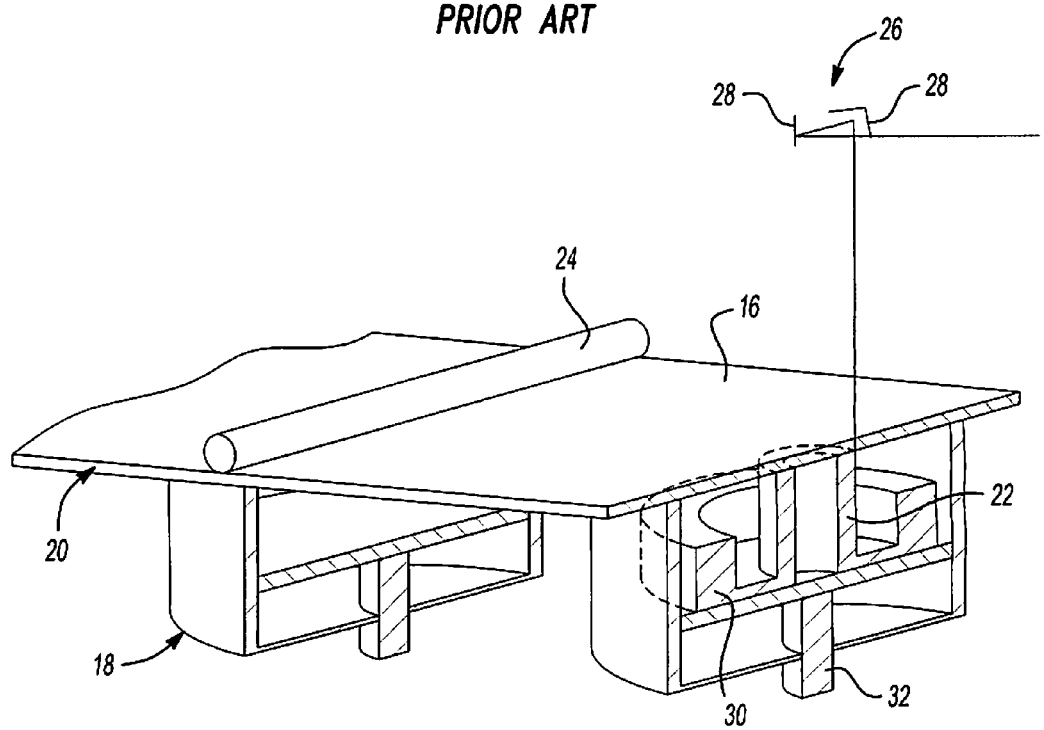
FIG. 2 is a schematic representation of a conventional selective laser sintering freeform fabrication process.

The present laser processing technique employs the use of two different types of lasers, for example, a 100 Watts carbon dioxide ($CO_2$) laser and a 250 Watts neodymium yttrium aluminum garnet (Nd:YAG) Q-switched diode pumped laser. Both lasers are generally represented by reference numeral 26 of FIG. 2. The decision of which laser to use depends on the type of material to be processed. For example, the $CO_2$ laser is used for the processing of polymers and ceramics because such materials exhibit high optical absorption at the $CO_2$ laser's 10.6 µm wavelength. The Nd:YAG laser is used in the processing of metals because metals have a high optical absorption at the Nd:YAG's 1.06 µm wavelength. The Nd:YAG laser is operated in both the continuous wave (CW) mode for laser sintering and the Q-switched mode when used for laser micromachining and laser milling. Further, the Nd:YAG laser may be operated in frequency doubled, tripled or quadrupled modes to obtain shorter harmonic wavelengths such as 0.532 µm, 0.355 µm and 0.255 µm. Such harmonic wavelengths are particularly useful for micromachining.

The movement of the laser beams 26 across the deposition bed 20 is carried out using a pair of software controlled galvanometer scanners. The laser 26 is preferably focused using a software controlled adaptive optics system capable of producing variable spot sizes. Alternatively, the laser 26 has a fixed spot size or a spot size that may be manually adjusted. A larger spot size is desired for sintering relatively large area features. In contrast, a finer spot size is used for sintering smaller features as well as for subsequent micromachining and planarization.

The temperature in the laser processing zone must be controlled to provide the ability to laser process a variety of different materials with different optical and thermophysical properties and different melting temperatures. In order to achieve such a temperature controlled processing zone, the present technique employs the use of a closed-loop laser spot temperature control system that modulates the laser power based on feedback from an in-situ emissivity correcting pyrometer.

The invention also provides for the processing of powder 16 materials in a controlled, oxygen free environment. In order to provide for such an environment, the invention provides for the use of a controlled processing chamber.

The newly developed solid freeform fabrication technique, as described above, has numerous commercial applications for manufacturing materials such as biomedical implants, energy production, storage devices and conversion devices, and nanocomposite devices.

Figure 10:
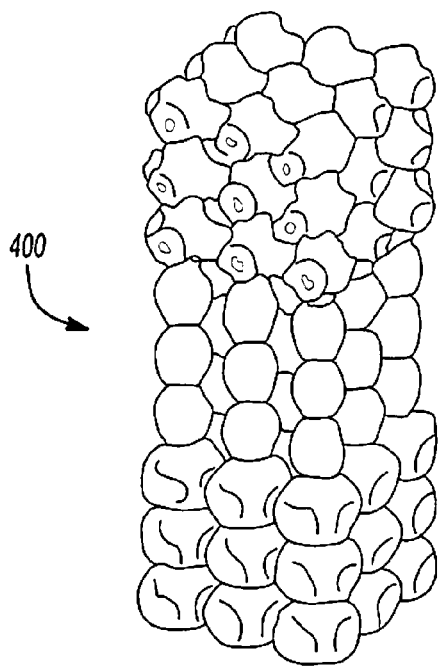
FIG. 10 is a schematic representation of a functionally tailored biomedical implant manufactured using the modified selective laser sintering process of the current invention.

The present solid freeform fabrication technique enables the construction of biomedical implants with functionally tailored geometry, composition, and porosity directly using bio-imaging digital data from techniques such as CT, MRI or confocal laser scanning microscopy. A general illustration of the types of configurations which may be employed to construct a biomedical implant is seen in FIG. 10 at 400. FIG. 10 illustrates a bio-implant with varying types of structure transitions such as a morphology of 3D connected spheres, ellipsoids connected only in the vertical direction, and orthogonal connected tubular channels. Biomedical composites with a heterogeneous composition similar to that of FIG. 10, such as polymer-polymer, polymer-biofactor, polymer-ceramic, polymer-biofactor-ceramic, polymer-metal, polymer-metal-ceramic and polymer-metal-biofactor-ceramic composites are just some examples of the types of composites that may be produced using the present solid freeform fabrication method.

In the case of polymer-polymer composites, the manufactured composite may consist of two or more polymers with a sharp boundary where the transition takes place from one polymer composition to another. A second type of polymer-polymer composite is one in which the transition from one polymer composition to the next takes place in a graded or gradual manner. Examples of such polymers as used in biomedical applications includes Poly(lactic acid), (PLA) and Poly(glycolic acid (PGA) with the co-polymers being referred to PLGA.

In the case of polymer-ceramic composites, the ceramic particles are intended to be embedded in a polymer matrix. Examples of polymers for biomedical applications include PLA and PGA, although other bio-degradable and bio-compatible polymers are equally applicable to the invention. Examples of just a few of the ceramics that may be used are nano- to microscale particles of Hydroxyapatite (HA) and Tri-Calcium Phosphate (TCP).

For polymer-biofactor composites, the polymer matrix is of the type PLA or PGA, but is not limited to PLA or PGA, with the biofactors including viruses, genes, proteins or drugs. Such biofactors may or may not be micro-encapsulated in a secondary material.

For the polymer-metal composites the polymers may consist of, among others, PLA or PGA. The metals may consist of, but are not limited to, Titanium and its alloys, as well as radioactive metals in the forms of particulates or wires.

Examples of specific biomedical implants that can be manufactured in a single assemblage using the present method are scaffolds for osteochondral defect and joint reconstruction, scaffolds for reconstructing bone/ligament and bone/tendon interfaces, scaffolds for reconstructing myo-tendinous interfaces, scaffolds that include blood vessel/tissue interfaces, biomimetic scaffolds that match real tissue structure including interface properties, and implants for joint replacement or fracture fixation that require gradients in both geometry and materials. In addition, whole joint structures may be manufactured in a single assemblage including a bone scaffold (made from a ceramic or ceramic-polymer composite), combined with a cartilage scaffold (made with PGA) and a ligament scaffold (made with PLGA).

An additional advantage of the present method is that during construction, the scaffold, for example, can be volumetrically seeded with precise dosages of drugs, proteins, genes or viruses to induce the local growth of specific types of tissues or blood vessels. The present solid freeform fabrication technique allows such scaffolds to be produced with a varying scaffold composition in different areas to cause different areas to degrade at different rates, thus causing any drug or bio-factor which may have been inserted into the bio-implant to release at a varying but controlled rate.

The present solid freeform fabrication method may also be adopted to the fabrication of energy production, storage, and conversion devices. The solid freeform fabrication method can be used to fabricate micro-combustors, microchemical reactors and fuel cells. The solid freeform fabrication method can be used to fabricate these devices or arrays of such devices in a single step using multiple material compositions optimized with respect to thermal, fluid and chemical reaction performance considerations.

The present solid freeform fabrication technique is also well adapted to the production of nonocomposite devices. Such devices include polymer-clay nonocomposites with vastly improved mechanical properties and fire retardance, nanocomposite magnets and ultrahard nanostructured cermets. The ability of the present solid freeform fabrication technique to deposit precise quantities of nano-scale materials at precise locations makes the technique well suited to produce such materials and thus provides an enhanced process for producing such materials.

The current invention uses new multi-material deposition techniques and laser processing techniques that enable the layer by layer construction of the above multifunctional devices in a single step. Additionally, the present invention enables the design and fabrication of such multifunctional devices with tailored properties and engineered multi-functionality spanning multiple length scales, ranging from the macro-scale to the nano-scale. The production process of the present invention enables design engineers to manufacture highly efficient, optimized and complex multifunctional devices that are able to perform functions that have, until now, been considered impossible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selective laser sintering method for producing a heterogeneous product in which a model of said heterogeneous product is generated using a computer and said model is processed using an electronic processing device to obtain a plurality of cross-sectional layer representations of said model, said method comprising: positioning an array of tapered delivery nozzles adjacent to a material deposition bed wherein said tapered delivery nozzles have a half angle less than 10.2 degrees; filling said array of tapered delivery nozzles with different materials, said materials differing in at least one of composition and deposition properties using at least one hopper, said filling step comprised of disposing said different materials within a funnel of said hopper such that said materials pass though an aperture, said materials further passing through an elongated portion of a standpipe connected to said aperture and coming to rest within another portion of said standpipe; and injecting a fluid through an aeration part located proximate said another portion to selectively cause said materials to exit said hopper through a terminal portion; directing said nozzle array to various positions relative to said deposition bed; disposing said materials simultaneously upon said deposition bed at said various positions; consolidating said deposited materials with a laser source to form a consolidated cross-sectional layer; and micromachining said consolidated cross-sectional layer with a pulsed laser source to form each of said plurality of cross-sectional layer representations of said model.

2. The method of claim 1, further comprising determining said various positions by processing said plurality of said cross-sectional layer representations using a control computer.

3. The method of claim 1, further comprising laser ablation of said cross-sectional layer representations to further define said features of said heterogeneous product.

4. The method of claim 1, further comprising introducing vibrational forces to at least one of said nozzles and said hopper.

5. The method of claim 1, further comprising providing said array as a sectional array having a size sufficient to cover a pre-selected partial portion of said deposition bed.

6. The method of claim 1, further comprising providing said array as a bed length array having a size sufficient to extend across an entire length of said deposition bed.

7. The method of claim 1, further comprising positioning said nozzles in a staggered configuration within said array.

8. The method of claim 1, further comprising the step of seeding said heterogeneous product with at least one of a drug, a protein, a gene, a virus, and any combination thereof.

9. The method of claim 1, wherein said materials are at least one of powders, liquids, particulate suspensions, and pastes.

10. The method of claim 1, further comprising varying a shape of a deposition opening of said nozzles to deposit a material line of a desired shape.

11. The method of claim 1, further comprising using said selective laser sintering method to produce a heterogeneous biomedical composite implant.

12. The method of claim 1, further comprising using said selective laser sintering method to produce at least one of a polymer-polymer composite, a polymer-biofactor composite, a polymer-ceramic composite, a polymer-biofactor-ceramic composite, a polymer-metal biomedical composite, a polymer-metal-ceramic composite, and a polymer-metal-biofactor- ceramic composite.

13. The method of claim 1, further comprising using said selective laser sintering method to produce one of either an energy production device, a storage device, a conversion device, or a nano- composite device.

14. The method of claim 1, wherein said nozzles further comprise micropipettes.

15. A selective laser sintering method for producing a heterogeneous product in which a model of said heterogenous product is generated using a computer and said model is processed using an electronic processing device to obtain a plurality of cross-sectional layer representations of said model, said method comprising: positioning an array of tapered delivery nozzles adjacent to a material deposition bed, wherein said tapered delivery nozzles have a half angle less than 10.2 degrees; filling said nozzle array with different materials, said materials differing in at least one composition and deposition properties; and wherein said filling said tapered delivery nozzles with said materials using at least one hopper, said filling step comprised of disposing said materials within a funnel of said hopper such that said materials pass through an aperture within said funnel, said materials further passing through an elongated portion of a standpipe connected to said aperture and coming to rest within an angled portion of said standpipe; and injecting a fluid through an aeration part located proximate said angled portion to selectively cause said materials to exit said hopper though a terminal portion at a controlled rate; directing said tapered delivery nozzles to various positions relative to said deposition bed and disposing said materials simultaneously upon said deposition bed at said various positions to form each of said plurality of cross-sectional layer representations of said model; consolidating said materials disposed upon said deposition bed; and micromachining at least one of said consolidated cross-sectional layer representations with a pulsed laser source to form said heterogeneous product, wherein said consolidation and micromachining steps are performed using a closed-loop laser spot temperature control system that modulates laser power based on feedback from an in-situ emissivity measuring pyrometer.

16. The method of claim 15, further comprising laser ablation of said materials disposed upon said deposition bed to further define said features of said heterogeneous product.

17. The method of claim 16, wherein said laser ablation step is performed using a closed loop laser spot temperature control system that modulates laser power based on feedback from an in-situ emissivity measuring pyrometer.

18. The method of claim 15, further comprising determining said various positions by processing said plurality of said cross-sectional layer representations using a control computer.

19. The method of claim 15, further comprising introducing vibrational forces to at least one of said nozzles and said hopper.

20. The method of claim 15, wherein said materials are at least one of powders, liquids, pastes, and particulate suspensions.

21. The method of claim 15, wherein said nozzles further comprise micropipettes.

22. A selective laser sintering apparatus for producing a heterogenous product using a computer to generate a model of said heterogenous product and an electronic processing device to obtain a plurality of cross-sectional layer representations of said model, said system apparatus comprising: an array of tapered delivery nozzles; a deposition bed located adjacent said tapered delivery nozzles; and a control device adapted to direct said array of tapered delivery nozzles to different positions relative to said deposition bed and controlling a deposit of materials simultaneously from said tapered delivery nozzles to said different positions upon said deposition bed; wherein said tapered delivery nozzles have a half angle less than 10.2 degrees; a hopper for filling said tapered delivery nozzles with said materials, said hopper comprised of: a funnel; a disk bonded within said funnel, said disk having numerous pores, said pores sized to permit passage of gas while restricting passage of said materials and an aperture; and at least one aeration part positioned below said disk and a closed-loop laser spot temperature control system that modulates laser power based on feedback from an in-situ emissivity measuring pyrometer operable to consolidate and micromachine said deposit of materials.

23. The apparatus of claim 22, wherein said different positions are determined by said control device upon processing said plurality of cross-sectional layer representations.

24. The apparatus of claim 22, further comprising: a laser adapted to consolidate said deposited materials to form said plurality of cross-sectional layer representations.

25. The apparatus of claim 22, wherein vibrational forces are introduced to at least one of said nozzles and said hopper.

26. The apparatus of claim 22, further comprising:
a standpipe extending from said funnel at a point below said disk, said standpipe comprised of: a first portion; a second portion extending from said first portion at an angle; a third portion extending from said second portion at an angle; and a second aeration part formed in at least one of said first, second, and third portions.

27. The apparatus of claim 22, wherein said array is a sectional array having a size sufficient to cover a pre-selected partial portion of said disposition bed.

28. The apparatus of claim 22, wherein said array is a bed length array that spans an entire length of said deposition bed.

29. The apparatus of claim 22, wherein said nozzles are positioned in a staggered configuration within said array.

30. The apparatus of claim 22, wherein said delivery nozzles are micropipettes.

31. The apparatus of claim 22, wherein said laser is modulated using a closed-loop laser spot temperature control system that modulates laser power based on feedback from an in-situ emissivity measuring pyrometer.

32. The apparatus of claim 22, wherein said nozzles comprise a filling point and a deposition opening.

33. The apparatus of claim 32, wherein a shape of said deposition opening is varied to deposit a material line of a desired shape.

34. The apparatus of claim 22, wherein said materials are at least one of powders, liquids, pastes, and particulate suspensions.

35. A device for filling tapered nozzles of a selective laser sintering system with materials, said device comprising: a hopper for filling said tapered nozzles with said materials, said hopper comprised of: a funnel having an aperture; a disk bonded within said funnel, said disk having numerous pores, said cores sized to permit passage of gas while restricting passage of said materials; a standpipe extending from said funnel and communicating with said aperture; a stop valve disposed along said standpipe; and an aeration portion disposed proximate said stop valve, said funnel is arranged to fill an array of tapered nozzles, said tapered nozzles having a half angle less than 10.2 degrees and vibrational forces are applied to at least one of said standpipe and to said nozzle to assist in movement of said materials though said device.

36. The device of claim 35, wherein said stop valve further comprises a portion of said standpipe angled relative to another portion of said standpipe extending from said funnel.

37. The device of claim 36, wherein said portion of said standpipe is angled at about 90 degrees relative to said another position.

38. The device of claim 36, wherein said portion further comprise an elbow of said standpipe.

39. The device of claim 38, further comprising a terminal portion of said standpipe extending at an angle relative to said elbow portion.

40. The device of claim 39, wherein said angle further comprises about a 90 degree angle.

41. The device of claim 35, wherein said funnel further comprises a sidewall and a disk connected to said sidewall, said disk including a plurality of pores therein.

42. The device of claim 41, wherein said pores are sized to permit gas to pass therethrough while preventing said materials from passing therethrough.

43. The device of claim 42, further comprising a second aeration part in communication with said pores.

44. The device of claim 35, wherein said materials are at least one of powders, liquids, pastes, and particulate suspensions.

45. The device of claim 35, wherein said nozzles further comprise micropipettes.

46. A device for filling tapered nozzles of a selective laser sintering system with materials, said device comprising: a plurality of hoppers for filling said tapered nozzles with said materials, each of said plurality of hoppers comprised of: a funnel having an aperture; a disk bonded within said funnel, said disk having numerous pores, said pores sized to permit passage of gas while restricting passage of said materials a standpipe extending from said funnel and communicating with said aperture; a stop valve disposed along said standpipe; and an aeration portion disposed proximate said stop valve, wherein each said funnel fills a respective one of said tapered nozzles, said tapered nozzles having a half angle less than 10.2 degrees and wherein vibrational forces are applied to at least one of said standpipe and to said tapered nozzles to assist in movement of said materials though said device.

* * * * *

UNITED STATES PATENT AND TRADEMARK OFFICE
CERTIFICATE OF CORRECTION

PATENT NO. : 7,509,240 B2  Page 1 of 1
APPLICATION NO. : 10/268359
DATED : March 24, 2009
INVENTOR(S) : Suman Das et al.

It is certified that error appears in the above-identified patent and that said Letters Patent is hereby corrected as shown below:

| | |
|---|---|
| Column 1, line 11 | After "Devices.", insert --"--. |
| Column 1, line 37 | "an" should be --a--. |
| Column 2, line 23 | "an" should be --a--. |
| Column 3, line 20 | After "is", insert --a--. |
| Column 3, line 27 | After "FIG. 6", insert --is--. |
| Column 5, line 33 | "then" should be --than--. |
| Column 7, line 31 | "array,305" should be --array 305--. |
| Column 11, line 56, claim 13 | "nano- composite" should be --nano-composite--. |
| Column 13, line 42, claim 35 | "cores" should be --pores--. |
| Column 14, line 4, claim 35 | "though" should be --through--. |
| Column 14, line 45, claim 46 | "though" should be --through--. |

Signed and Sealed this

Fourteenth Day of July, 2009

JOHN DOLL
*Acting Director of the United States Patent and Trademark Office*